US008808425B2

(12) United States Patent
Genkin et al.

(10) Patent No.: US 8,808,425 B2
(45) Date of Patent: Aug. 19, 2014

(54) PROCESS AND APPARATUS FOR PRODUCING HYDROGEN AND CARBON MONOXIDE

(75) Inventors: Eugene S. Genkin, Allentown, PA (US); Hoanh Nang Pham, Allentown, PA (US); Xiaoguang Zhang, Macungie, PA (US); Keith Alan Ludwig, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 134 days.

(21) Appl. No.: 13/478,597

(22) Filed: May 23, 2012

(65) Prior Publication Data

US 2013/0047665 A1     Feb. 28, 2013

Related U.S. Application Data

(60) Provisional application No. 61/528,943, filed on Aug. 30, 2011.

(51) Int. Cl.
*C01B 3/56*      (2006.01)
*F25J 3/02*      (2006.01)
*B01D 53/047*      (2006.01)

(52) U.S. Cl.
CPC ........... *C01B 3/56* (2013.01); *C01B 2203/0405* (2013.01); *C01B 2203/0415* (2013.01); *C01B 2203/043* (2013.01); *C01B 2203/047* (2013.01); *C01B 2203/0475* (2013.01); *C01B 2203/146* (2013.01); *C01B 2203/148* (2013.01); *F25J 3/0223* (2013.01); *F25J 2205/60* (2013.01); *B01D 53/047* (2013.01)
USPC .................................... 95/96; 95/126; 62/134

(58) Field of Classification Search
CPC ............... C01B 2203/0405; C01B 2203/0415; C01B 2203/043; C01B 2203/047; C01B 2203/0475; C01B 2203/146; C01B 2203/148; C01B 3/56; F25J 2205/40; F25J 2205/60; F25J 3/0223; F25J 3/0252; F25J 3/0261; B01D 53/047
USPC ........... 423/210, 220, 648.1–656; 95/96, 117, 95/126, 140, 236; 96/121, 113, 134; 62/617
See application file for complete search history.

(56) References Cited

U.S. PATENT DOCUMENTS 4,553,981 A * 11/1985 Fuderer .......................... 48/62 R
5,096,470 A * 3/1992 Krishnamurthy ................ 95/102
(Continued)

FOREIGN PATENT DOCUMENTS

DE     42 10 638 A1     3/1993
EP     1 544 166 A2     6/2005
(Continued)

*Primary Examiner* — Frank Lawrence
(74) *Attorney, Agent, or Firm* — Bryan C. Hoke, Jr.

(57) ABSTRACT

Apparatus and process for producing a hydrogen-containing product stream and a carbon monoxide-containing product stream from a crude synthesis gas produced in a syngas production unit. Carbon dioxide is removed from the process gas by a non-cryogenic means and the hydrogen-containing product stream is separated from the process gas in a pressure swing adsorber. Residual gas from the pressure swing adsorber is passed to a cryogenic separation unit where the cryogenic separation unit separates the residual gas stream into the carbon monoxide-containing product stream, a hydrogen-enriched stream, a methane-enriched stream, and a carbon monoxide-containing intermediate stream by cryogenic fractionation. At least a portion of the hydrogen-enriched stream is recycled to the pressure swing adsorber.

19 Claims, 1 Drawing Sheet

(56) References Cited

U.S. PATENT DOCUMENTS

| | | | |
|---|---|---|---|
| 5,351,491 A | 10/1994 | Fabian | |
| 6,328,945 B1 * | 12/2001 | Hufton et al. | 423/418.2 |
| 6,500,241 B2 * | 12/2002 | Reddy | 96/134 |
| 6,719,007 B2 | 4/2004 | Smith, IV et al. | |
| 7,066,984 B2 | 6/2006 | Dunn | |
| 7,380,413 B2 * | 6/2008 | Dumont et al. | 62/617 |
| 7,452,393 B2 | 11/2008 | Engler et al. | |
| 7,871,457 B2 * | 1/2011 | Shah et al. | 95/96 |
| 8,557,024 B2 * | 10/2013 | Reddy et al. | 95/92 |
| 2008/0216652 A1 | 9/2008 | Keller et al. | |
| 2008/0308769 A1 | 12/2008 | Marty et al. | |
| 2010/0223952 A1 | 9/2010 | McNeil | |
| 2011/0126459 A1 | 6/2011 | Haik-Beraud et al. | |

FOREIGN PATENT DOCUMENTS

| | | |
|---|---|---|
| EP | 1 716 906 A1 | 11/2006 |
| EP | 2967491 A2 | 9/2008 |

\* cited by examiner

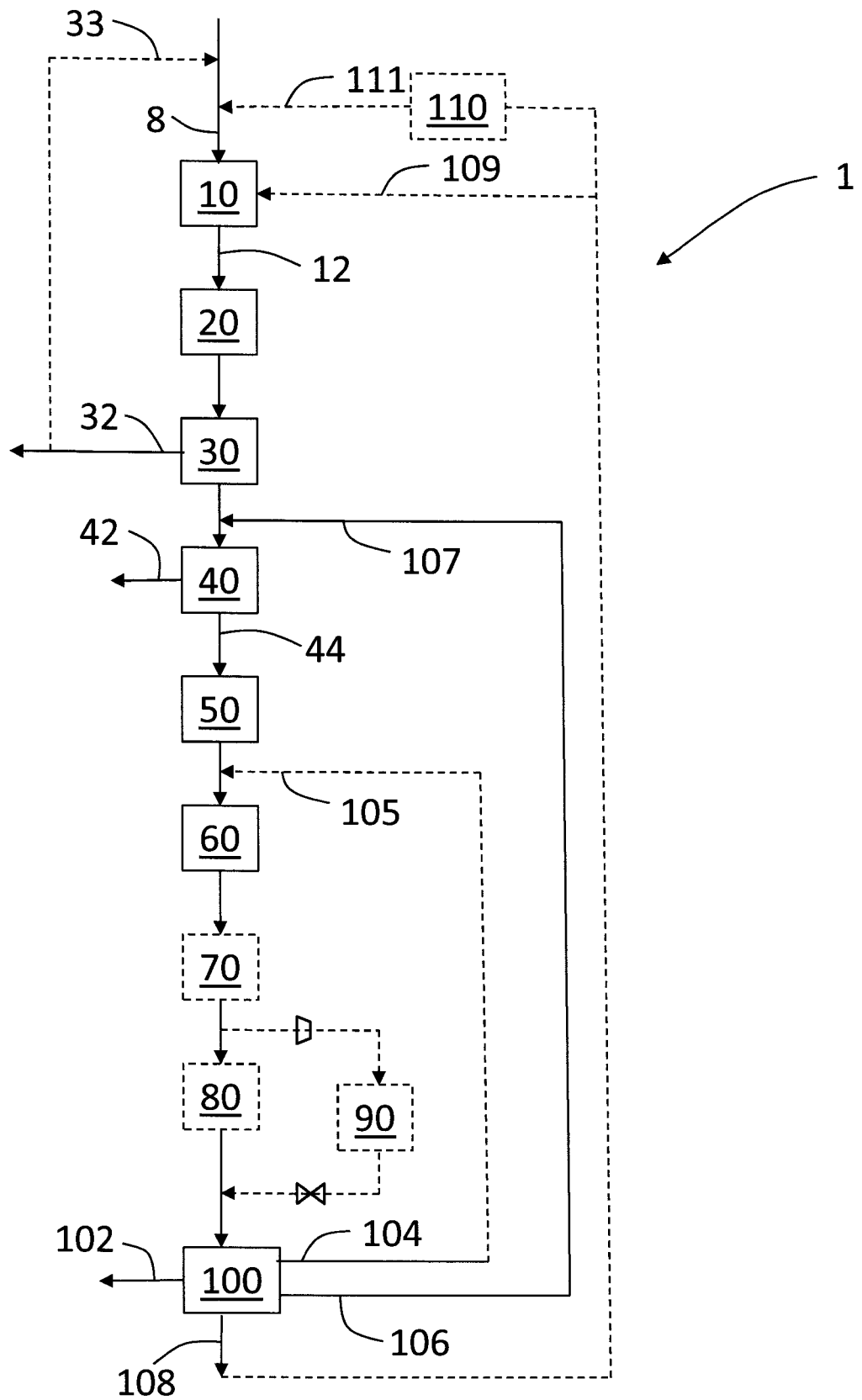

US 8,808,425 B2

PROCESS AND APPARATUS FOR PRODUCING HYDROGEN AND CARBON MONOXIDE

CROSS-REFERENCE TO RELATED APPLICATIONS

This patent application claims priority from Provisional Application Ser. No. 61/528,943, titled "Process and Apparatus for Producing Hydrogen and Carbon Monoxide", filed on Aug. 30, 2011, the contents of which are hereby incorporated by reference.

BACKGROUND

Hydrogen, carbon monoxide, and mixtures of hydrogen and carbon monoxide are desirable feedstocks for chemical and petrochemical processes.

The conversion of hydrocarbons to hydrogen and carbon monoxide containing gases is well known in the art. Examples of such processes include catalytic steam reforming, autothermal catalytic reforming, catalytic partial oxidation, and non-catalytic partial oxidation. Each of these processes has advantages and disadvantages and produce various ratios of hydrogen and carbon monoxide, also known as synthesis gas.

The crude synthesis gas formed by the conversion of hydrocarbons is then separated by various processes to form the desired hydrogen, carbon monoxide, and/or mixtures of hydrogen and carbon monoxide. Separation of the carbon monoxide is typically done by cryogenic separation in a cryogenic separation unit or cold box and separation of hydrogen from the crude synthesis gas is typically done by pressure swing adsorption.

Cryogenic separators require a steady feed, both in terms of composition and pressure. Consequently, carbon monoxide is removed from the crude synthesis gas stream first, followed by separation of the hydrogen-containing stream in a pressure swing adsorber, since the output from a pressure swing adsorber varies both in composition and pressure.

Industry desires a process and apparatus for separating hydrogen and carbon monoxide from a crude synthesis gas where the process and apparatus are robust and stable.

Industry desires a process and apparatus for separating hydrogen and carbon monoxide from a crude synthesis gas with high recovery of hydrogen and carbon monoxide and high energy efficiency.

BRIEF SUMMARY

The present invention relates to a process and apparatus for producing $H_2$ and CO. There are several aspects of the process as outlined below.

Aspect 1. An apparatus for producing a $H_2$-containing product stream and CO-containing product stream from a process gas, the apparatus comprising:
  a synthesis gas production unit for generating the process gas, the process gas comprising $H_2$, CO, $CO_2$, and $H_2O$;
  a water removal unit for removing $H_2O$ from the process gas;
  a $CO_2$ removal unit for removing $CO_2$ from the process gas without cryogenically fractionating the process gas;
  a pressure swing adsorber for separating $H_2$ from the process gas thereby forming the $H_2$-containing product stream and a residual gas stream;
  a mixing device for attenuating the amplitude of the molar concentration of one or more components in the residual gas stream to less than 1 mole %;
  a compressor for compressing the residual gas stream;
  a cryogenic separation unit for receiving the residual gas stream after the compressor and after the mixing device, the cryogenic separation unit for separating the residual gas stream into the CO-containing product stream, a $H_2$-enriched stream, a methane-enriched stream, and a CO-containing intermediate stream by cryogenic fractionation in the cryogenic separation unit; and
  a conduit for recycling at least a portion of the $H_2$-enriched stream to the pressure swing adsorber.

Aspect 2. The apparatus of aspect 1 further comprising a controller for controlling the pressure swing adsorber, the controller having a sequence of coded instructions requiring that the residual gas stream is withdrawn from the pressure swing adsorber at a pressure between 260 kPa (absolute) and 420 kPa (absolute) or between 315 kPa (absolute) and 385 kPa (absolute).

Aspect 3. The apparatus of aspect 1 or aspect 2 further comprising:
  a second conduit for recycling at least a portion of the CO-containing intermediate stream to a location upstream of the compressor and downstream of the pressure swing adsorber.

Aspect 4. The apparatus of any one of aspects 1 to 3 further comprising:
  a third conduit for conveying at least a portion of the methane-enriched stream to the synthesis gas production unit for use as fuel in a combustion reaction.

Aspect 5. The apparatus of any one of aspects 1 to 4 further comprising:
  a fourth conduit and a second compressor for conveying at least a portion of the methane-enriched stream to the synthesis gas production unit as a reactant feed for forming the process gas.

Aspect 6. The apparatus of any one of aspects 1 to 5 further comprising:
  a drier operatively connected between the compressor and the cryogenic separation unit to remove $H_2O$ and $CO_2$ before the residual gas is passed to the cryogenic separation unit.

Aspect 7. The apparatus of aspect 6 wherein the drier is a thermal swing adsorber.

Aspect 8. The apparatus of any one of aspects 1 to 7 further comprising:
  a buffer vessel operatively connected between the compressor and the cryogenic separation unit for dampening pressure variation of the residual gas before the residual gas is passed to the cryogenic separation unit.

Aspect 9. The apparatus of any one of aspects 1 to 8 further comprising:
  a second mixing device operatively connected between the compressor and the cryogenic separation unit for dampening pressure variation of the residual gas and further attenuating the amplitude of the molar concentration of one or more components in the residual gas before the residual gas is passed to the cryogenic separation unit.

Aspect 10. The apparatus of any one of aspects 1 to 9 wherein the $CO_2$ removal unit is operatively connected between the synthesis gas production unit and the pressure swing adsorber.

Aspect 11. The apparatus of any one of aspects 1 to 10 further comprising:
  a fifth conduit operatively connecting the $CO_2$ removal unit and the synthesis gas production unit for conveying at least a portion of the $CO_2$ removed from the process stream in the $CO_2$ removal unit to the synthesis gas production unit for use as reactant feed gas for forming the process gas.

Aspect 12. A process for producing a $H_2$-containing product stream and CO-containing product stream from a process gas, the process comprising:
generating the process gas in a production unit, the process gas comprising $H_2$, CO, $CO_2$, and $H_2O$;
removing $H_2O$ from the process gas;
removing $CO_2$ from the process gas without cryogenically fractionating the process gas;
separating $H_2$ from the process gas by pressure swing adsorption in a pressure swing adsorber thereby forming the $H_2$-containing product stream and a pressure swing adsorber residual gas stream, the residual gas stream withdrawn from the pressure swing adsorber at a pressure between 260 kPa (absolute) and 420 kPa (absolute) or between 315 kPa (absolute) and 385 kPa (absolute), the residual gas stream withdrawn having a time-varying molar concentration of one or more components with an amplitude greater than 2.5 mole % or greater than 3 mole % during a pressure swing adsorber cycle;
attenuating the amplitude of the molar concentration of the one or more components in the residual gas stream to less than 1 mole % in a mixing device;
compressing the residual gas stream in a compressor;
passing the residual gas stream to a cryogenic separation unit subsequent to the steps of attenuating and compressing;
separating the residual gas stream into the CO-containing product stream, a $H_2$-enriched stream, a methane-enriched stream, and a CO-containing intermediate stream by cryogenic fractionation in the cryogenic separation unit; and
introducing at least a portion of the $H_2$-enriched stream into the pressure swing adsorber.

Aspect 13. The process of aspect 12 further comprising:
introducing at least a portion of the CO-containing intermediate stream upstream of the compressor and downstream of the pressure swing adsorber.

Aspect 14. The process of aspect 12 or aspect 13 further comprising:
introducing at least a portion of the methane-enriched stream into the production unit as fuel thereby providing heat for generating the process gas by indirect heat transfer.

Aspect 15. The process of any one of aspects 12 to 14 further comprising:
compressing and subsequently introducing at least a portion of the methane-enriched stream into the production unit as a reactant feed for forming the process gas.

Aspect 16. The process of any one of aspects 12 to 15 further comprising:
passing the residual gas stream from the compressor to a drier to remove $H_2O$ and $CO_2$ prior to passing the residual gas to the cryogenic separation unit.

Aspect 17. The process of aspect 16 wherein the drier is a thermal swing adsorber.

Aspect 18. The process of any one of aspects 12 to 17 further comprising:
passing at least a portion of the residual gas stream from the drier to a buffer vessel for dampening pressure variation of the residual gas stream prior to passing the residual gas stream to the cryogenic separation unit.

Aspect 19. The process of any one of aspects 12 to 18 further comprising:

passing at least a portion of the residual gas stream from the drier to a second mixing device thereby dampening pressure variation and further attenuating the amplitude of the molar concentration of the one or more components in the residual gas prior to passing the residual gas stream to the cryogenic separation unit.

Aspect 20. The process of any one of aspects 12 to 19 wherein the $CO_2$ is removed by a $CO_2$ removal unit before separating $H_2$ from the process gas by pressure swing adsorption.

Aspect 21. The process of any one of aspects 12 to 20 wherein at least a portion of the $CO_2$ removed from the process gas is recycled to the production unit as a reactant feed gas for forming the process gas.

Aspect 22. The process of any one of aspects 12 to 21 further comprising:
measuring a $N_2$ concentration in the $H_2$-containing product stream; and decreasing the pressure swing adsorber cycle time to decrease the $N_2$ concentration in the $H_2$-containing product stream.

Aspect 23. The process of any one of aspects 12 to 22 using the apparatus of any one of aspects 1 to 11.

Aspect 24. The process of any one of aspects 12 to 22 further comprising providing the apparatus of any one of aspects 1 to 11.

BRIEF DESCRIPTION OF SEVERAL VIEWS OF THE DRAWINGS

The FIGURE is process flow diagram illustrating a preferred embodiment of the invention.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion of a stream may include specific components of the stream from which it is derived.

Downstream and upstream refer to the intended flow direction of the process fluid transferred. If the intended flow direction of the process fluid is from the first device to the second device, the second device is in downstream fluid flow communication of the first device.

The term "enriched" means having a greater mole % concentration of the indicated gas than the original stream from which it was formed. Then, the hydrogen-enriched stream has a greater hydrogen mole % concentration than the residual gas stream from which it is formed. Likewise, the methane-enriched stream has a greater methane mole % concentration than the residual gas stream from which it is formed.

The present invention relates to a process and apparatus for producing a $H_2$-containing product stream and CO-containing product stream from a process gas.

The present invention is described with reference to the FIGURE illustrating a process flow diagram for the process and apparatus.

For the purposes of simplicity and clarity, detailed descriptions of well-known devices, circuits, and methods are omitted so as not to obscure the description of the present invention with unnecessary detail.

The apparatus comprises a synthesis gas production unit 10 for generating the process gas 12. The process gas is what is generally termed a crude synthesis gas and comprises $H_2$, CO, $CO_2$, and $H_2O$. Synthesis gas is also called syngas. As used herein, synthesis gas is any gaseous mixture comprising $H_2$ and CO.

The synthesis gas production unit 10 may be any device known in the art for producing crude synthesis gas. For example the synthesis gas production unit may be a steam reformer (also called a steam methane reformer or steam hydrocarbon reformer), an autothermal reformer, a partial oxidation reactor (PDX reactor), and/or gasifier. Details of the construction and operation of the various synthesis gas production units are available in the open literature and will not be provided here.

In case the synthesis gas production unit is a PDX reactor, the apparatus may include a shift reactor (not shown) to modify the ratio of $H_2$ to CO in the process gas. One or more shift reactors may be used. The one or more shift reactors may be so-called high temperature shift reactors, medium temperature shift reactors, and/or low temperature shift reactors.

"High temperature" shift reactors typically have an inlet temperature ranging from 330° C. to 400° C., and an outlet temperature ranging from 400° C. to 500° C. High temperature shift reactors often use an iron oxide/chromia catalyst.

"Low temperature" shift reactors typically have an inlet temperature ranging from 190° C. to 230° C. and an outlet temperature ranging from 250° C. to 300° C. Low temperature shift reactors often use a catalyst comprising metallic copper, zinc oxide, and one or more other difficulty reducible oxides such as alumina or chromia.

Shifting may be done in a "combination" of shift reactors, for example, using the sequence of high temperature shift, cooling by indirect heat exchange, and low temperature shift. If desired, either shift stage can be subdivided with interbed cooling.

"Medium temperature" shift reactors typically have an inlet temperature ranging from 250° C. to 325° C. and an outlet temperature up to 400° C. A suitably formulated supported copper catalyst may be used.

The apparatus also comprises a water removal unit 20 for removing $H_2O$ from the process gas. Typically the process gas from a synthesis gas production unit is at high temperature and heat is recovered from the process gas as part of further processing of the process gas. For example, the process gas may be passed to a waste heat boiler to extract heat from the process gas and generate steam. The process gas may be further cooled to condense out water from the process gas and thereby removed $H_2O$ from the process gas. The steam generated in the waste heat boiler may be used in the synthesis gas production unit for generating the process gas.

The apparatus also comprises a $CO_2$ removal unit 30 for removing $CO_2$ 32 from the process gas without cryogenic fractionation. The $CO_2$ removal unit may be any device known in the art for removing $CO_2$ from the process gas by non-cryogenic means. The $CO_2$ removal unit may be selected from at least one of a scrubber, an adsorber, an absorber, and a membrane separator. For example the $CO_2$ removal unit may be a $CO_2$ scrubber. $CO_2$ scrubbing can be carried out using any known, commercially available scrubbing techniques and scrubbing materials. The Benfield aqueous alkaline scrubbing process, the Shell Sulfinol and the UOP™ Selexol™, Lurgi Rectisol®, BASF's aMDEA solvent extraction processes are examples of commercial techniques for removing $CO_2$ from gas streams that are useful. Alternatively, $CO_2$ may be extracted by pressure swing adsorption, chemical absorption, membrane separation, complex metal oxides, and the like. In some methods, the gas feed to the $CO_2$ removal unit maybe cooled in a heat exchanger prior to being introduced into the $CO_2$ removal unit.

Pressure swing adsorption (PSA) may be used for separation of $CO_2$ from a mixture of gases. In PSA techniques, at a high partial pressure, solid molecular sieves adsorb $CO_2$ more strongly than some other gases. As a result, at elevated pressures, $CO_2$ is removed from the mixture of gases as this mixture is passed through an adsorption bed. Regeneration of the bed is accomplished by depressurization and purging. Typically for critical operations, a plurality of adsorption vessels is used for continuous separation of $CO_2$, wherein one adsorption bed is utilized for $CO_2$ separation while the others are regenerated.

Another technique for separation of $CO_2$ from a gas stream is chemical absorption using oxides, such as calcium oxide (CaO) and magnesium oxide (MgO) or a combination thereof. At elevated pressure and temperature, $CO_2$ may be absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of $CO_2$ from a gas stream. The membranes used for high temperature $CO_2$ extraction include zeolite and ceramic membranes, which are selective to $CO_2$. However, the separation efficiency of membrane technology is low, and complete separation of $CO_2$ may not be achieved through membrane separation.

Yet another technique used for extraction of $CO_2$ may include, by it not limited to, chemical absorption of $CO_2$ using amines. The feed to the $CO_2$ extractor is cooled to a suitable temperature to use chemical absorption of $CO_2$ using amines. This technique is based on alkanol amines solvents that have the ability to absorb $CO_2$ at relatively low temperature and are easily regenerated by raising the temperature of the rich solvents. A $CO_2$-rich stream is obtained after regeneration of the rich solvent. The solvents used in this technique may include, for example, triethanolamine, monoethanolamine, diethanolamine, diisopropanolamine, diglycolamine, and methyldiethanolamine. Another technique for separating $CO_2$ may by physical absorption. It may be noted than all or a combination of any of the techniques described above for $CO_2$ separation can be used to separate $CO_2$ advantageously.

Additional $H_2O$ may be removed along with the $CO_2$ in the $CO_2$ removal unit.

The $CO_2$ removal unit is operatively connected between the synthesis gas production unit 10 and the pressure swing adsorber 40 (described below).

Another $H_2O$ removal unit (not shown) may be downstream of the $CO_2$ removal unit.

The $CO_2$ removed in the $CO_2$ removal unit 30 may be recycled for use as a reactant feed gas 8 for forming the process gas 12. The relative amount of CO formed in the process gas 12 may be altered by introducing recycled $CO_2$. The apparatus may further comprise conduit 33 operatively connecting the $CO_2$ removal unit 30 and the synthesis gas production unit 10 for conveying at least a portion of the $CO_2$ 32 removed from the process stream in the $CO_2$ removal unit 30 to the synthesis gas production unit 10 for use as reactant feed gas 8 for forming the process gas 12.

As used herein, a "conduit" is a pipe, tube, or any other fluid tight passage through which a fluid is conveyed.

The apparatus also comprises a pressure swing adsorber 40 for separating $H_2$ from the process gas thereby forming the $H_2$-containing product stream 42 and a residual gas stream 44. Pressure swing adsorption is a well-known process used in hydrogen production for purification. The pressure swing adsorber and process can incorporate any desired number of adsorbent beds and any known processing cycles for recovering product hydrogen. Any suitable adsorbent material having desirable selectivity for purposes of the method can be used in the practice of the method. Suitable adsorbents include, for example, zeolitic molecular sieves, activated carbon, silica gel, activated alumina and the like. Zeolitic molecular sieve adsorbents are generally desirable for separation and purification of hydrogen from reformed gas mixtures. The pressure swing adsorber system may include one or more surge tanks.

The process may comprise measuring a $N_2$ concentration in the $H_2$-containing product stream and controlling a cycle time of the pressure swing adsorber to maintain the $N_2$ concentration below a target $N_2$ concentration. The pressure swing adsorber cycle time may be decreased to decrease the $N_2$ concentration in the $H_2$-containing product stream. The pressure swing adsorber cycle time may be increased to increase the $N_2$ concentration in the $H_2$-containing product stream.

The residual gas stream may be formed from the pressure swing adsorption cycle during the depressurization (blowdown) and/or purge phases.

In case the $CO_2$ removal unit is a pressure swing adsorber or vacuum swing adsorber, the pressure swing adsorber for separating $H_2$ may be integrated with the $CO_2$ removal unit. Examples of integrated units are disclosed in U.S. Pat. Nos. 4,171,206, RE 31,014, 4,790,858, 4,813,980, 4,914,218, and 5,133,785.

The apparatus further comprises a controller (not shown) for controlling the pressure swing adsorber 40. The controller may have a sequence of coded instructions requiring that the residual gas stream 44 is withdrawn from the pressure swing adsorber 40 at a pressure between 260 kPa and 420 kPa or between 315 kPa and 385 kPa, which is a greater pressure than typically used. The reason that the residual gas stream is typically withdrawn at lower pressures is because the hydrogen recovery suffers when withdrawing the residual gas at higher pressures. The advantage of withdrawing the residual gas at a greater pressure, that is between 260 kPa and 420 kPa or between 315 kPa and 385 kPa, is that less power is required for the downstream compressor (discussed below). The controller and sequence of coded instruction may control the pressure by controlling the power to the compressor thereby affecting the suction pressure of the compressor.

The apparatus also comprises a mixing device 50 for attenuating the amplitude of the molar concentration of one or more components in the residual gas stream 44 to less than 1 mole %. Since the article "a" means "one or more," when referring to the mixing device, the amplitude of the molar concentration of the one or more components may be attenuated to less than 1 mole % in one or more mixing devices.

Because of the variation of the composition of gases in an adsorption bed at the end of the adsorption step and the relative affinity of the adsorbent for the various components, the concentration of the components in the residual gas will vary with time during the depressurization and/or purge phases of the PSA cycle.

The amplitude of the concentration of a component is the difference between an extreme of the concentration of the component during a PSA cycle and the time-averaged mean concentration of the component for a PSA cycle. The time-averaged mean concentration is defined:

$$\overline{C} = \frac{1}{T} \int_0^T C(t) \cdot dt$$

where $\overline{C}$ is the time-averaged mean concentration of a component, $C(t)$ is the concentration of the component as a function of time, t is the time variable, T is the time for the PSA system to complete one cycle.

The mixing device is capable of attenuating the amplitude of the molar concentration of the one or more components to less than 1 mole %. Suitable mixing devices may be selected by the skilled person. U.S. Pat. No. 6,719,007 to Smith, IV et al., incorporated herein by reference, describes a suitable mixing device.

The apparatus also comprises a compressor 60 for compressing the residual gas stream from the pressure swing adsorber. The compressor may include a recycle loop as is known in the art.

The compressor 60 is preferably positioned downstream of the mixing device 50, however the compressor 60 may be upstream of the mixing device 50.

The apparatus also comprises a cryogenic separation unit 100 for receiving the residual gas stream after the compressor 60 and after the mixing device 50. The cryogenic separation unit is for separating the residual gas stream into the CO-containing product stream 102, a $H_2$-enriched stream 106, a methane-enriched stream 108, and a CO-containing intermediate stream 104 by cryogenic fractionation in the cryogenic separation unit 100.

The CO-containing product stream may be a purified (>99.9 mole % CO) CO stream or an "oxogas" having a desired $CO:H_2$ ratio. As used herein, an "oxogas" is a $CO/H_2$ blend. For example the CO-containing product stream may be an oxogas having a $CO:H_2$ ratio of 1:1, or a $CO:H_2$ ratio of 1:2, or any other desired ratio depending on downstream product requirements using the oxogas. The CO-containing product stream may have a CO molar concentration from 30 mole % to 100 mole %.

The $H_2$-enriched stream 106 has a greater molar concentration of $H_2$ than the residual gas stream introduced into the cryogenic separation unit 100 from which the $H_2$-enriched stream was formed. The $H_2$-enriched stream may have a molar concentration from 60 mole % to 95 mole % $H_2$.

The apparatus comprises conduit 107 for recycling at least a portion of the $H_2$-enriched stream 106 to the pressure swing adsorber 40. The $H_2$-rich stream may be introduced with the process gas fed to the pressure swing adsorber. The $H_2$-rich stream may be mixed with the process gas at any point between the synthesis gas production unit and the PSA. Alternatively, the $H_2$-rich stream may be introduced separately into the pressure swing adsorber.

Recycling the $H_2$-enriched stream improves the overall $H_2$ recovery of the system. This is particularly important when the residual gas stream 44 is withdrawn from the pressure swing adsorber at a pressure between 260 kPa (absolute) and 420 kPa (absolute), because withdrawing in this higher pressure range results in more hydrogen passing through to the residual gas. The "local" $H_2$ recovery in the PSA is reduced, but the overall $H_2$ recovery is improved due to recycling the $H_2$-enriched stream.

The methane-enriched stream 108 has a greater molar concentration of $CH_4$ than the residual gas stream introduced into the cryogenic separation unit 100 from which the methane-enriched stream was formed. The $CH_4$-enriched stream may have a molar concentration from 45 mole % to 85 mole % $CH_4$.

The methane-enriched stream 108 may be used as a fuel in the synthesis gas production unit 10, for example, when the synthesis gas production unit is a steam methane reformer. The apparatus may further comprise conduit 109 for conveying at least a portion of the methane-enriched stream to the synthesis gas production unit 10 for use as fuel in a combustion reaction.

Additionally or alternatively, the methane-enriched stream 108 may be recycled to the synthesis gas production unit 10 as reactant feed 8 for forming the process gas 12. The apparatus may further comprise conduit 111 and compressor 110 for conveying at least a portion of the methane-enriched stream 108 to the synthesis gas production unit 10 as a reactant feed 8 for forming the process gas 12.

The CO-containing intermediate stream 104 contains CO and other component species. The CO-containing intermediate stream may have a molar concentration from 20 mole % to 60 mole % CO. The CO-containing intermediate stream may have a CO concentration from 20 mole % CO to 60 mole % CO and a methane concentration from 0.5 mole % methane to 3 mole % methane.

The apparatus may further comprise a conduit 105 for recycling at least a portion of the CO-containing intermediate stream 104 to a location upstream of the compressor 60 and downstream of the pressure swing adsorber 40. The CO-containing intermediate stream 104 will likely be at a pressure lower than suitable for introducing into the cryogenic separation unit, and therefore need to be compressed. Recycling the CO-containing stream back to the process gas means that the system will be able to recover the CO in the CO-containing intermediate stream improving the overall CO recovery of the system.

Suitable cryogenic separation units and cycles are known in the art. The cryogenic separation unit may include a methane wash cycle and/or partial condensation cycle. The specific design and operation of the cryogenic separation unit will of course depend the desired products of the system.

US2010-0223952 illustrates an example cryogenic separation unit suitable for separating the residual gas into a CO-containing product stream, a $H_2$-enriched stream, a methane-enriched stream and a CO-containing intermediate stream by cryogenic fractionation. With reference to the FIGURE and the table in US2010-0223952, streams 11 and 22 may be regarded as CO-containing product streams: stream 11 (73 mole % $H_2$ and 27 mole % CO) being an oxogas stream and stream 22 (99 mole % CO) being an essentially pure CO product stream. Stream 6 (87 mole % $H_2$) may be regarded as a $H_2$-enriched stream and stream 27 (55 mole % $CH_4$) may be regarded as a methane-enriched stream. Stream 15 (46 mole % CO) may be regarded as a CO-containing intermediate stream.

The apparatus may further comprise a drier 70 operatively connected between the compressor 60 and the cryogenic separation unit 100 to remove any trace amounts of $H_2O$ and $CO_2$ before the residual gas is passed to the cryogenic separation unit 100. The drier 70 may be a thermal swing adsorber (TSA). Thermal swing adsorption for removing $H_2O$ and $CO_2$ is a well-known process. Thermal swing adsorbers for removing $H_2O$ and $CO_2$ are known, for example, US 2008/0308769 A1 describes a dessication unit, which is a thermal swing adsorber.

The apparatus may further comprise a buffer vessel 90 operatively connected between the compressor 60 and the cryogenic separation unit 100 for dampening pressure variation of the residual gas before the residual gas is passed to the cryogenic separation unit 100. The buffer vessel 90 contains residual gas at a pressure higher than the feed gas to the cryogenic separation unit. Flow from the buffer vessel to the cryogenic separation unit is controlled to make up any flow needed when the feed to the cryogenic separation unit is low due to pressure variation in the system.

The apparatus may further comprise an additional mixing device 80 operatively connected between the compressor 60 and the cryogenic separation unit 100 for dampening pressure variation of the residual gas and further attenuating the amplitude of the molar concentration of one or more components in the residual gas before the residual gas is passed to the cryogenic separation unit 100. The mixing device 80 may be of the same design as mixing device 50.

The process for producing a $H_2$-containing product stream and a CO-containing product stream from a process gas is described below with reference to the FIGURE.

The process comprises generating the process gas 12 in a production unit 10. The process gas is a crude synthesis gas comprising $H_2$, CO, $CO_2$, and $H_2O$.

The process comprises removing $H_2O$ from the process gas. $H_2O$ may be removed in a water removal unit 20 as discussed above for the apparatus.

The process comprises removing $CO_2$ from the process gas without cryogenically fractionating the process gas. $CO_2$ may be removed, for example, by sorption and/or membrane separation. $CO_2$ may be removed in a $CO_2$ removal unit as described above for the apparatus. At least a portion of the $CO_2$ removed from the process gas may be recycled to the production unit 10 as reactant feed gas 8 for forming process gas 12. The relative amount of CO formed in the process gas 12 may be altered by recycling $CO_2$.

$H_2O$ may be removed from the process gas before the $CO_2$ is removed. Additionally $H_2O$ may be removed from the process gas during the $CO_2$ removal step and after the $CO_2$ is removed.

The process also comprises separating $H_2$ from the process gas by pressure swing adsorption in a pressure swing adsorber 40 thereby forming the $H_2$-containing product stream 42 and a pressure swing adsorber residual gas stream 4. $H_2$ may be separated in a pressure swing adsorber as discussed above for the apparatus. $CO_2$ may be preferably removed by the $CO_2$ removal unit before separating $H_2$ from the process gas by pressure swing adsorption.

The residual gas stream 44 is withdrawn from the pressure swing adsorber 40 at a pressure between 260 kPa (absolute) and 420 kPa (absolute), or between 315 kPa (absolute) and 385 kPa (absolute) which is a greater pressure than typically used. The reason that the residual gas stream is typically withdrawn at lower pressures than 260 MPa is because the hydrogen recovery suffers when withdrawing the residual gas at higher pressures. The advantage of withdrawing the residual at a greater pressure, that is between 260 kPa (absolute) and 420 kPa (absolute), is that less power is required for the downstream compressor.

The residual gas stream 44 is withdrawn having a time-varying molar concentration of one or more components with an amplitude greater than 2.5 mole % or greater than 3 mole % during a pressure swing adsorber cycle. Because of the variation of the composition of gases in an adsorption bed at the end of the adsorption step and the relative affinity of the adsorbent for the various components, the concentration of the components in the residual gas will vary with time during the depressurization and/or purge phases of the PSA cycle. For example, the $H_2$ concentration may vary by about ±3 mole % from the time-averaged mean concentration, the $N_2$ concentration may vary by about ±4 mole % from the time-averaged mean concentration, the CO concentration may vary by about ±5 mole % from the time-averaged mean concentration, and the methane concentration may vary by about +1.5 mole % from the time-averaged mean concentration. Since $H_2$, $N_2$, and CO vary by more than 2.5 mole %, one or more components (in this case 3 components) are withdrawn having a time-varying molar concentration with an amplitude greater than 2.5 mole % during the pressure swing adsorber cycle.

The process comprises attenuating the amplitude of the molar concentration of the one or more components in the residual gas stream to less than 1 mole % in a mixing device. The mixing device may be as described above for the apparatus.

The process comprises compressing the residual gas stream in compressor 60.

The amplitude of the molar concentration of the one or more components may be attenuated before the residual gas is compressed or the residual gas may be compressed before the amplitude of the molar concentration of the one or more components is attenuated as per design preference.

The process comprises passing the residual gas stream to a cryogenic separation unit 100 subsequent to the steps of attenuating and compressing. The cryogenic separation unit may be as described above for the apparatus.

The process comprises separating the residual gas stream into the CO-containing product stream 102, a $H_2$-enriched stream 106, a methane-enriched stream 108, and a CO-containing intermediate stream 104 by cryogenic fractionation in cryogenic separation unit 100. CO-containing product stream 102, $H_2$-enriched stream 106, methane-enriched stream 108, and CO-containing intermediate stream 104 are as described above for the apparatus.

The process comprises introducing at least a portion of the $H_2$-enriched stream 106 into the pressure swing adsorber 40. The $H_2$-rich stream may be introduced with the process gas fed to the pressure swing adsorber. The $H_2$-rich stream may be mixed with the process gas at any point between the synthesis gas production unit and the PSA. Alternatively, the $H_2$-rich stream may be introduced separately into the pressure swing adsorber.

Recycling the $H_2$-enriched stream improves the $H_2$ recovery of the system. This is particularly important when the residual gas stream 44 is withdrawn from the pressure swing adsorber at a pressure between 260 kPa and 420 kPa.

The process may further comprise introducing at least a portion of the CO-containing intermediate stream 104 upstream of the compressor 60 and downstream of the pressure swing adsorber 40. The CO-containing intermediate stream may be introduced at any point after the pressure swing adsorber 40 and before the compressor 60. Recycling the CO-containing stream back to the process gas means that the system will be able to recover the CO in the CO-containing intermediate stream improving the overall CO recovery of the system.

The process may further comprise introducing at least a portion of the methane-enriched stream 108 into the production unit 10 as fuel thereby providing heat for generating the process gas 12. The methane-enriched stream is particularly suited for use as a fuel in a steam methane reformer.

The process may further comprise compressing and subsequently introducing at least a portion of the methane-enriched stream 108 into the production unit 10 as reactant feed 8 for forming the process gas 12.

The process may further comprise passing the residual gas stream from the compressor 60 to a drier 70 to remove any trace amounts of $H_2O$ and $CO_2$ prior to passing the residual gas to the cryogenic separation unit 100. The drier may be as discussed above for the apparatus. The drier may be a thermal swing adsorber.

The process may further comprise passing at least a portion of the residual gas stream from drier 70 to buffer vessel 90 for dampening pressure variation of the residual gas stream prior to passing the residual gas stream to cryogenic separation unit 100. The buffer vessel may be as described above for the apparatus.

The process may further comprise passing at least a portion of the residual gas stream from drier 70 to mixing device 80 thereby dampening pressure variation and further attenuating the amplitude of the molar concentration of the one or more components in the residual gas prior to passing the residual gas stream to cryogenic separation unit 100. Mixing device 80 may be as described above for the apparatus.

Although the present invention has been described as to specific embodiments or examples, it is not limited thereto, but may be changed or modified into any of various other forms without departing from the scope of the invention as defined in the accompanying claims. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

We claim:

1. An apparatus for producing a $H_2$-containing product stream and CO-containing product stream from a process gas, the apparatus comprising:

a synthesis gas production unit for generating the process gas, the process gas comprising $H_2$, CO, $CO_2$, and $H_2O$;

a water removal unit for removing $H_2O$ from the process gas;

a $CO_2$ removal unit for removing $CO_2$ from the process gas without cryogenically fractionating the process gas;

a pressure swing adsorber for separating $H_2$ from the process gas thereby forming the $H_2$-containing product stream and a residual gas stream;

a mixing device for attenuating the amplitude of the molar concentration of one or more components in the residual gas stream to less than 1 mole %;

a compressor positioned downstream of the mixing device for compressing the residual gas stream;

a cryogenic separation unit for receiving the residual gas stream after the compressor and after the mixing device, the cryogenic separation unit for separating the residual gas stream into the CO-containing product stream, a $H_2$-enriched stream, a methane-enriched stream, and a CO-containing intermediate stream by cryogenic fractionation in the cryogenic separation unit;

a second mixing device operatively connected between the compressor and the cryogenic separation unit for dampening pressure variation of the residual gas and further attenuating the amplitude of the molar concentration of one or more components in the residual gas before the residual gas is passed to the cryogenic separation unit; and a conduit for recycling at least a portion of the $H_2$-enriched stream to the pressure swing adsorber.

2. The apparatus of claim 1 further comprising a controller for controlling the pressure swing adsorber, the controller having a sequence of coded instructions requiring that the residual gas stream is withdrawn from the pressure swing adsorber at a pressure between 260 kPa and 420 kPa.

3. The apparatus of claim 1 further comprising:
a second conduit for recycling at least a portion of the CO-containing intermediate stream to a location upstream of the compressor and downstream of the pressure swing adsorber.

4. The apparatus of claim 1 further comprising:
a third conduit for conveying at least a portion of the methane-enriched stream to the synthesis gas production unit for use as fuel in a combustion reaction.

5. The apparatus of claim 1 further comprising:
a fourth conduit and a second compressor for conveying at least a portion of the methane-enriched stream to the synthesis gas production unit as a reactant feed for forming the process gas.

6. The apparatus of claim 1 further comprising:
a drier operatively connected between the compressor and the cryogenic separation unit to remove $H_2O$ and $CO_2$ before the residual gas is passed to the cryogenic separation unit.

7. The apparatus of claim 6 wherein the drier is a thermal swing adsorber.

8. The apparatus of claim 1 further comprising:
a buffer vessel operatively connected between the compressor and the cryogenic separation unit for dampening pressure variation of the residual gas before the residual gas is passed to the cryogenic separation unit.

9. The apparatus of claim 1 wherein the $CO_2$ removal unit is operatively connected between the synthesis gas production unit and the pressure swing adsorber.

10. The apparatus of claim 1 further comprising:
a fifth conduit operatively connecting the $CO_2$ removal unit and the synthesis gas production unit for conveying at least a portion of the $CO_2$ removed from the process stream in the $CO_2$ removal unit to the synthesis gas production unit for use as reactant feed gas for forming the process gas.

11. A process for producing a $H_2$-containing product stream and CO-containing product stream from a process gas, the process comprising:
generating the process gas in a production unit, the process gas comprising $H_2$, CO, $CO_2$, and $H_2O$;
removing $H_2O$ from the process gas;
removing $CO_2$ from the process gas without cryogenically fractionating the process gas;
separating $H_2$ from the process gas by pressure swing adsorption in a pressure swing adsorber thereby forming the $H_2$-containing product stream and a pressure swing adsorber residual gas stream, the residual gas stream withdrawn from the pressure swing adsorber at a pressure between 260 kPa and 420 kPa, the residual gas stream withdrawn having a time-varying molar concentration of one or more components with an amplitude greater than 2.5 mole % during a pressure swing adsorber cycle;
attenuating the amplitude of the molar concentration of the one or more components in the residual gas stream to less than 1 mole % in a mixing device;
compressing the residual gas stream in a compressor;
passing the residual gas stream from the compressor to a drier to remove $H_2O$ and $CO_2$ prior to passing the residual gas to the cryogenic separation unit;
passing at least a portion of the residual gas stream from the drier to a second mixing device thereby dampening pressure variation and further attenuating the amplitude of the molar concentration of the one or more components in the residual gas prior to passing the residual gas stream to a cryogenic separation unit;
passing the residual gas stream to the cryogenic separation unit subsequent to the steps of attenuating and compressing;
separating the residual gas stream into the CO-containing product stream, a $H_2$-enriched stream, a methane-enriched stream, and a CO-containing intermediate stream by cryogenic fractionation in the cryogenic separation unit; and
introducing at least a portion of the $H_2$-enriched stream into the pressure swing adsorber.

12. The process of claim 11 further comprising:
introducing at least a portion of the CO-containing intermediate stream upstream of the compressor and downstream of the pressure swing adsorber.

13. The process of claim 11 further comprising:
introducing at least a portion of the methane-enriched stream into the production unit as fuel thereby providing heat for generating the process gas.

14. The process of claim 11 further comprising:
compressing and subsequently introducing at least a portion of the methane-enriched stream into the production unit as a reactant feed for forming the process gas.

15. The process of claim 11 wherein the drier is a thermal swing adsorber.

16. The process of claim 11 further comprising:
passing at least a portion of the residual gas stream from the drier to a buffer vessel for dampening pressure variation of the residual gas stream prior to passing the residual gas stream to the cryogenic separation unit.

17. The process of claim 11 wherein the $CO_2$ is removed by a $CO_2$ removal unit before separating $H_2$ from the process gas by pressure swing adsorption.

18. The process of claim 11 wherein at least a portion of the $CO_2$ removed from the process gas is recycled to the production unit as a reactant feed gas for forming the process gas.

19. The process of claim 11 further comprising:
measuring a $N_2$ concentration in the $H_2$-containing product stream; and decreasing the pressure swing adsorber cycle time to decrease the $N_2$ concentration in the $H_2$-containing product stream.

* * * * *